March 12, 1963 V. E. FARNSWORTH 3,081,057
MIRROR-MOUNTING ATTACHMENT MEANS FOR A MOTOR VEHICLE
Filed Jan. 10, 1962 2 Sheets-Sheet 1

INVENTOR.
VAUN E. FARNSWORTH

March 12, 1963    V. E. FARNSWORTH    3,081,057
MIRROR-MOUNTING ATTACHMENT MEANS FOR A MOTOR VEHICLE
Filed Jan. 10, 1962    2 Sheets-Sheet 2

INVENTOR.
VAUN E. FARNSWORTH

United States Patent Office 3,081,057
Patented Mar. 12, 1963

3,081,057
MIRROR-MOUNTING ATTACHMENT MEANS
FOR A MOTOR VEHICLE
Vaun E. Farnsworth, 343 W. Dryden St., Glendale, Calif.
Filed Jan. 10, 1962, Ser. No. 165,352
3 Claims. (Cl. 248—226)

Generally speaking, the present invention comprises a mirror-mounting attachment means for a motor vehicle (such as an automobile, pick-up truck, or the like) adapted to be quickly and easily engaged and disengaged with respect thereto whenever desired and, when engaged with respect thereto, being adapted for removably mounting an auxiliary rear vision mirror at a substantially laterally offset location relative to the vehicle whereby to enhance the rearward field of view of a driver of the vehicle adjacent the rear of the vehicle and, more particularly, in most cases adjacent the rear of an auxiliary vehicle or substantial rearward extension vehicle portion (usually a trailer, or the like) positioned behind the vehicle and extending rearwardly to a point such as to inhibit or substantially reduce the rearward field of view of the driver of the vehicle obtained by way of conventional prior art rear vision mirrors.

It should be noted that the above-mentioned enhanced rearward field of view is provided by the present invention primarily by reason of the substantial degree of lateral offset of the auxiliary rear vision mirror provided by the novel quick-engageable and quick-disengageable mirror-mounting attachment means of the present invention.

I am aware of the fact that several types of prior art mirror-mounting attachment means for a motor vehicle adapted to mount an auxiliary rear vision mirror at a substantially laterally offset location have been developed heretofore. However, all such prior art arrangements known to me are of a type intended to be substantially permanently mounted on the motor vehicle by mounting means which, in certain cases, deface or mar certain portions of the motor vehicle and which in all cases are of a nature such as to not be quick-engageable and quick-disengageable in the novel manner of the present invention, which can be placed in operative relationship with respect to a motor vehicle in a matter of a few moments when the motor vehicle is to be used for trailer-hauling use or the like, and can similarly be removed therefrom in a matter of a few moments when the vehicle is to be conventionally used and said auxiliary rear vision mirror is not desired or required. This advantageous feature is not present in any prior art auxiliary rear vision mirror attachment means in the novel and highly advantageous manner of the present invention.

The novel mirror-mounting attachment means of the present invention comprises a substantially V-shaped bracket means having the ends of the legs thereof engaging the vehicle body and having the mirror-mounting portion thereof disposed adjacent to the juncture of the legs of said bracket means. The free end of one of the legs of said bracket means carries engaging means adapted to engage a suitable mounting edge portion of a motor vehicle (such as the edge of a side portion of a motor vehicle engine compartment, the edge of a motor vehicle door or door window frame, or the like) in a readily removable manner. The one of the said legs carrying said engaging means constitutes a tensile member means extending outwardly from said engaging means and is adapted to be positioned outwardly of the corresponding outer surface portion of the motor vehicle when the engaging means is engaged with said mounting edge portion of the vehicle. Said tensile member means is provided with an outer carrier means adjustably carrying the other leg of said bracket means constituting an inwardly directed compression member means having inner abutment end means for exterior forcible abutment with the outside surface of the corresponding portion of the motor vehicle whereby to rigidly support said engaging means, said tensile member means, said carrier means, and said compression member means relative to said motor vehicle and on the outer side of said surface portion of the motor vehicle. This will cause the apparatus to be maintained in a position extending outwardly therefrom to a substantially laterally offset location where said apparatus is provided with a mirror mount adapted to mount (usually controllably removably and adjustably mount) rear vision mirror means at a desired optimum outwardly spaced location relative to the motor vehicle and relative to the conventional eye position of a driver thereof. This will provide an effectively enhanced and increased rearward field of view for the driver of the motor vehicle at a rearwardly extended position relative to the vehicle.

In one preferred form of the invention, the mirror mount is carried by an extension arm which is effectively carried by said carrier means. This may be by direct connection thereto or by reason of the fact that it may comprise an outward extension of said compression member means. However, various other arrangements are contemplated and are within the broad scope of the present invention.

In one preferred form of the invention, said compression member means is controllably adjustably carried by said carrier means and is provided with controllably operable locking means for locking said compression member means in any desired inwardly and/or outwardly adjusted relationship relative thereto, and for unlocking same when desired.

In one preferred form of the invention, said inner abutment end means for the compression member means comprises compressible, protective, frictional, engagement bumper means of a non-marring type for non-marring engagement with the corresponding portion of the outer surface of the motor vehicle.

In one specific form of the present invention, this may take the form of a slip-over cap of elastomeric material, or the like, although the invention is not specifically so limited.

In one preferred form of the invention, the engaging means may take the form of engaging hook means having a substantial width in a direction substantially transverse to the outward direction of said tensile member means and parallel to said mounting edge means of the vehicle adapted to be engaged thereby along a substantial length portion thereof whereby to prevent for-and-aft pivotal or rocking movement of said tensile member means, said carrier means and said outwardly laterally spaced mirror mount.

In one specific form of the invention, said engaging hook means may be provided with compressible protective means on an engaging portion thereof whereby to prevent damage or injury to the mounting edge portion of the motor vehicle and adjacent regions of the motor vehicle body adjacent to the region of the engagement of said engaging hook means therewith.

It is an object of the present invention to provide a novel quick-engageable and quick-disengageable mirror-mounting attachment means of the character referred to above, in various broad aspects, in various preferred aspects, and/or in various specific aspects, and which is of extremely simple, inexpensive, easy-to-mount and easy-to-dismount, substantially foolproof construction such as to be conducive to widespread use thereof.

It is a further object of the present invention to provide a novel quick-engageable and quick-disengageable mirror-mounting attachment means of the character referred to above which is readily adaptable to a great number of different types of vehicles and/or which is adapted to engage various different mounting edge portions thereof when placed in a mounted operative use position.

Further objects are implicit in the detailed description which follows hereinafter (which is to be considered as exemplary of, but not specifically limiting, the invention), and said objects will be apparent to persons skilled in the art after a careful study of the detailed description which follows hereinafter.

For the purpose of clarifying the nature of the present invention, two exemplary embodiments (and minor variations of each of said embodiments) are illustrated in the hereinbelow-described figures of the accompanying drawings and are described in detail hereinafter.

Figure 1:
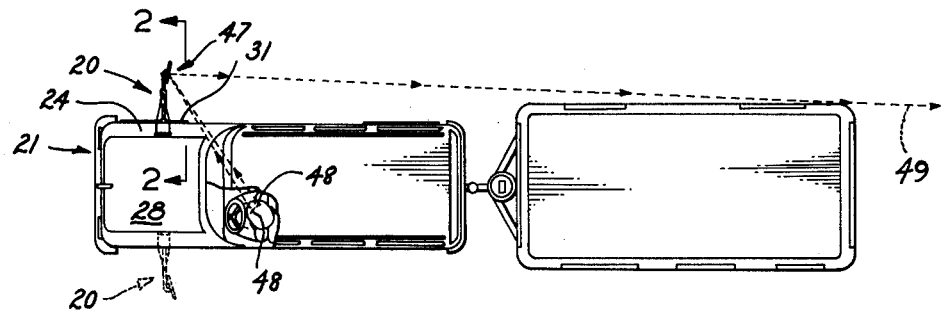
FIG. 1 is a greatly reduced-size top plan view illustrating in solid or full lines the attachment of one form of the present invention with respect to a motor vehicle which is shown pulling a trailer. A second similar (although positionally reversed) attachment unit and mirror is shown in broken lines on the other side of the vehicle.
Figures 2, 3, 5:
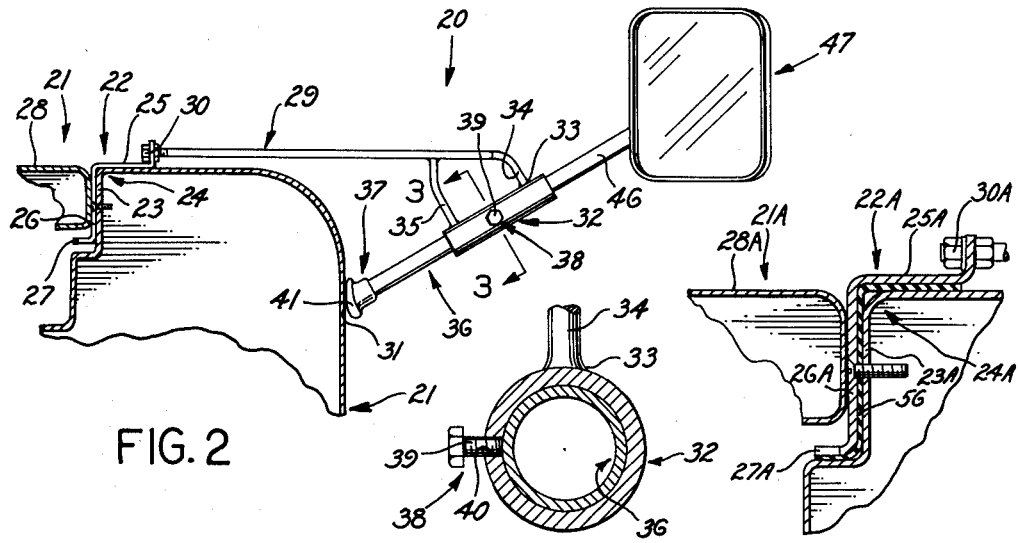
FIG. 2 is a larger-scale fragmentary view in section with regard to the motor vehicle and in elevation with regard to the attachment means taken in the direction of the arrows 2—2 of FIG. 1.
FIG. 3 is an additionally enlarged fragmentary sectional view of the carrying means and locking means of the apparatus taken in the direction of the arrows 3—3 of FIG. 2.
FIG. 5 is a fragmentary view similar to the left portion of FIG. 2, although slightly enlarged with respect thereto, illustrating a slight modification of the engaging means.
Figure 4:
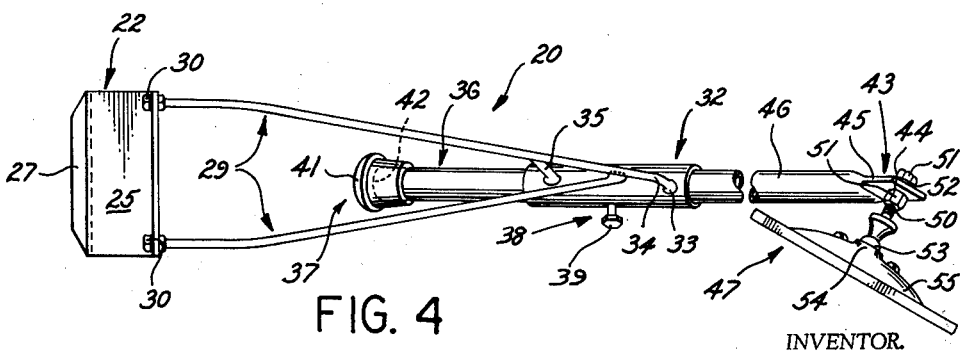
FIG. 4 is a top plan view of the attachment means with a central portion of the extension arm broken away and removed for drawing space conservation reasons.

Referring to FIGS. 1–4 for exemplary purposes, one illustrative embodiment of the invention takes a typical exemplary form wherein it comprises a mirror-mounting attachment means, generally designated by the reference numeral 20, adapted to be mounted with respect to a motor vehicle in the operative use position shown in FIGS. 1 and 2. The motor vehicle is shown fragmentarily in said view and is designated generally by the reference numeral 21.

It should be clearly understood that the motor vehicle 21 may be provided with two such mirror-mounting attachment means of the type designated generally by the reference numeral 20 in similar positions on opposite sides of the vehicle 21 or, in certain instances, may be provided with only one such mirror-mounting attachment means 20.

The mirror-mounting attachment means 20, in the form of the invention illustrated in FIGS. 1–4, comprises the engaging means, indicated generally at 22, which is adapted to engage a suitable mounting edge portion of the vehicle 21. In the specific form of the invention illustrated in FIGS. 1–4, said motor vehicle mounting edge portion is designated by the reference numeral 23 and comprises the inner edge of an engine compartment side portion 24. However, various other mounting edge portions may be employed, certain of which will be described hereinafter.

The engaging means 22 in the specific form of the invention illustrated in FIGS. 1–4, takes the form of a hook means having an upper portion 25 and a downwardly directed portion 26 provided with a lower lip 27 whereby to be suitable for engagement with the corresponding engine compartment mounting edge part 23 in a manner such as to allow the hood 28 of the vehicle 21 to be closed after the engaging hook means 22 is placed in engagement with said mounting edge part 23.

The engaging hook means 22 is provided with tensile member means, indicated generally at 29, connected thereto by suitable fastening means 30 and extending outwardly therefrom to a location positioned outwardly of the corresponding surface 31 of the vehicle 21, where said tensile member means is provided with outer carrier means, indicated generally at 32.

In the specific example illustrated in FIGS. 1–4, the outer carrier means 32 comprises a short section of hollow tubing or pipe connected, as indicated at 33, to the forward end 34 of the tensile member means 29 and connected by an additional brace 35 to one of the two members of the tensile member means 29 whereby to provide a firm, rigid and desired angular interconnection between the longitudinal direction of the tensile member means 29 and the axial direction of the hollow tubing or pipe comprising the carrier means 32.

The outer carrier means 32 effectively carries an inwardly directed compression member means, indicated generally at 36, having an inner abutment end means, indicated generally at 37, adapted for exterior forcible abutment with the exterior outside surface 31 of the vehicle 21 whereby to rigidly support the entire device in the manner shown in FIGS. 1 and 2.

In the specific form of the invention illustrated in FIGS. 1–4, said inwardly directed compression member means 36 comprises a hollow tubular pipe slidably mounted in the hollow interior of the tubular pipe comprising the carrier means 32 for slidable axial movement inwardly toward the motor vehicle surface portion 31 or outwardly away therefrom in order to provide a desired adjustment for optimum positioning of the entire device with respect to the vehicle 21.

Also in the specific form of the invention illustrated in FIGS. 1–4, the carrier means 32 is effectively provided with controllably operable locking means, indicated generally at 38, and in this case comprising a screw 39 positioned in the threaded aperture 40 in the carrier means 32, which can be controllably screwed inwardly into forcible abutment with the compression member means 36 for locking same when desired and which can be controllably screwed outwardly for releasing same when desired.

In the specific example illustrated in FIGS. 1–4 the inner abutment end means 37 of the compression member means 36 comprises a compressible, protective, frictional, engagement bumper means 41 of a non-marring type for non-marring engagement with the outer surface 31 of the vehicle 21. In the form illustrated for exemplary purposes, it comprises a slip-over cap, preferably of elastomeric material resiliently mounted on the end 42 of the pipe comprising the compression member means 36. However, it should be noted that the inner abutment end means is not limited to this specific structure, but may assume various other substantially equivalent structures within the broad scope of the present invention.

The invention also includes a mirror mount adapted to carry a rear vision mirror at a desired outwardly spaced location relative to the motor vehicle 21. In the specific exemplary form of the invention illustrated, in FIGS. 1–4, said mirror mount is designated by the reference numeral 43 and comprises an aperture 44 in the flattened end 45 of an extension arm 46 effectively carried by the carrier means 32 and extending outwardly therefrom.

It will be noted that, in the specific form of the invention illustrated in FIGS. 1–4, said extension arm 46 effectively comprises an integral outward extension of the hollow tubular pipe comprising the compression member means 32, although the invention is not specifically so limited but is intended to broadly include various arrangements whereby the mirror mount 43 is effectively mounted with respect to the carrier means 32 at any desired location relative thereto (usually outwardly spaced therefrom).

The mirror mount 43 is adapted to mount a rear vision mirror, such as the exemplary one generally designated by the reference numeral 47, in a position such as to enhance the rearward field of view of a driver of the vehicle 21 at the normal location of the driver's eyes as indicated diagrammatically at 48. The extended rearward field of view is generally designated by the reference numeral 49.

In the specific form illustrated in FIGS. 1–4 the mirror 47 is mounted relative to the mirror mount 43 by means of a threaded member 50 which extends through the aperture 44 and is locked on each side thereof firmly to the flattened end 45 by fastening nuts 51 and lock washer means 52. The threaded member 50 is provided at its forward end with a ball 53 swivelly engaged within a correspondingly partially spherically-shaped recessed portion 54 carried by the back surface 55 of the mirror 47 (usually adjacent the center thereof). This swivel mounting arrangement is conventional and, therefore, is not described and illustrated in great particularity.

In the exemplary form of the invention illustrated in FIGS. 1–4, the engaging hook means 22 has a substantial width in a direction substantially transverse to the outward direction of the tensile member means 29 whereby to engage a substantial length portion of the engine compartment mounting edge part 23. This acts to prevent fore-and-aft pivotal or rocking movement of the tensile member means 29, the carrier means 32, the compression member 36, the extension arm 46, and the mirror 47 in a manner which would unfavorably affect the steadiness of the enhanced rearward field of view adapted to be provided by the mirror 47.

FIG. 5 illustrates, in fragmentary form, a slight modification of the first form of the invention wherein certain inner engaging portions of the engaging hook means are provided with compressible protective means designated by the reference numeral 56 whereby to prevent any damage or injury to portions of the motor vehicle adjacent to the engagement of the engaging hook means therewith. In this modification, all portions similar to those illustrated in the first form of the invention are indicated by similar reference numerals followed by the letter "A," however. No further description of this modification is thought necessary.

FIGS. 6–9 illustrate a further modification of the first form of the invention illustrated in FIGS. 1–4, and similar parts are indicated by similar reference numerals, primed, however.

It will be noted that, in this modification, the major difference is the fact that the engaging hook means 22′ has a slightly different configuration from the engaging hook means 22 shown in the first form of the invention. This is occasioned by reason of the fact that said modified engaging hook means 22′ is adapted to engage a different mounting edge part 23′ than the mounting edge part 23 engaged in the first form of the invention by the engaging hook means 22.

In its modified form, the mounting edge part 23′ adapted to be engaged by the modified engaging hook means 22′ comprises an upper forward edge of a forwardly projecting portion 57 of a door 58 of the vehicle 21′.

It will be noted that the arrangement is such that the door 58 can be closed after the modified engaging hook means 22′ is engaged with said mounting edge part 23′ carried by said forwardly projecting door portion 57. Except for the differences referred to above, the structure, mode of attachment, and cooperational relationship of this modification of the invention with respect to the surface 59 of the door 58 is substantially identical to that previously described in detail with respect to the first form of the invention illustrated in FIGS. 1–4. Therefore, it is thought that additional description of this modified form would be quite redundant and, therefore, purposeless.

Figures 8, 10:
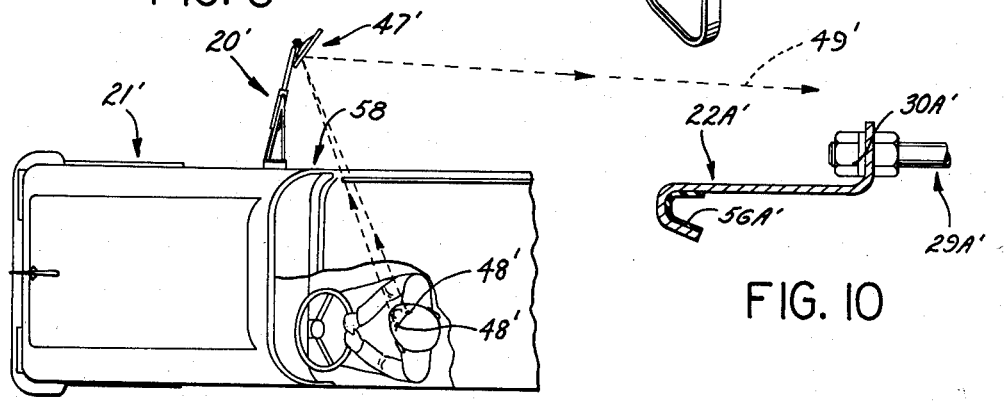
FIG. 8 is a greatly reduced-size top plan view of the modified form of the invention shown in FIG. 6 illustrated in mounted relationship with respect to the car door on one side of the motor vehicle as seen from the top, it being understood that, if desired, a similar unit may be mountd on the opposite car door.
FIG. 10 is a fragmentary view illustrating a modified form of the engagement means employed in the version of the invention shown in FIGS. 6–9.
Figure 9:
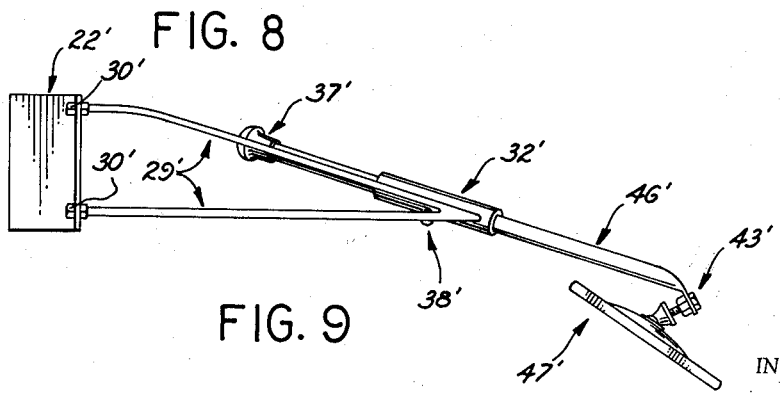
FIG. 9 is a larger-scale top plan view of the modified form of the invention.

FIG. 10 illustrates a slight modification of the engaging hook means 22′ of the modified form of the invention illustrated in FIGS. 6–9. This engaging hook modification is quite similar to that illustrated in FIG. 5 and comprising a slight modification of the engaging hook means 22 of the first form of the invention illustrated in FIGS. 1–4. In the modification shown in FIG. 10, parts similar to those of the second major modification of the invention illustrated in FIGS. 6–9 are indicated by similar reference numerals, with the letter "A" preceding the prime mark, however.

Figures 6, 7:
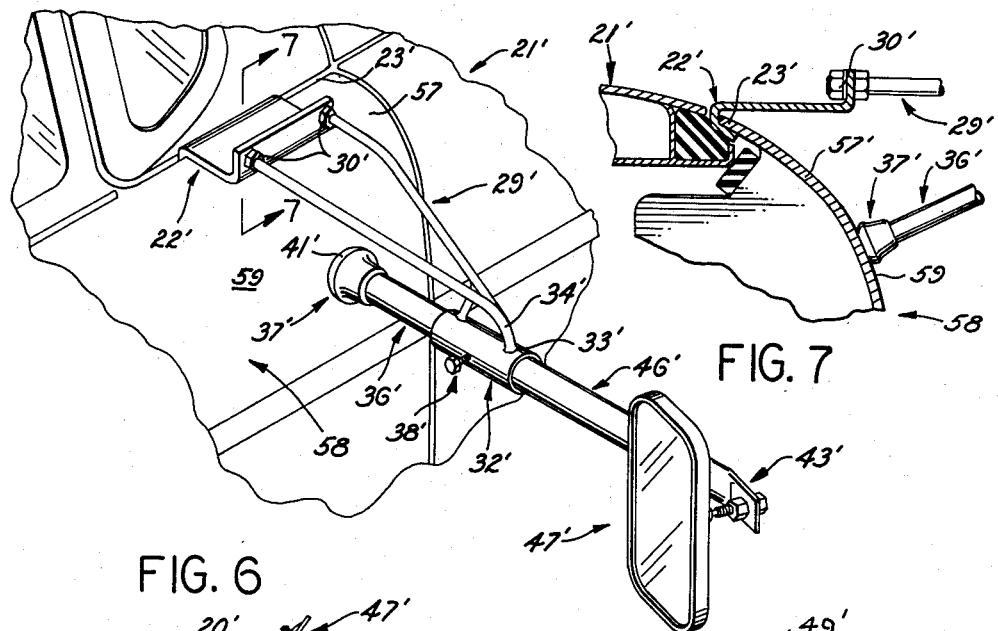
FIG. 6 is an enlarged, fragmentary, perspective view illustrating the attachment of a modified form of the invention with respect to a vehicle door rather than with respect to an engine compartment side portions as shown in the first form of the invention illustrated in FIGS. 1–4.
FIG. 7 is an enlarged fragmentary view, partly in section and partly in elevation, taken in the direction of the arrows 7—7 of FIG. 6.

In FIG. 10 modification, the engaging hook means 22A′ is identical to the engaging hook means 22′ of the modification of the invention illustrated in FIGS. 6–9 but is provided with inner compressible protective means 56A′ similar to that shown at 56 in FIG. 5 except for the shape thereof and similarly adapted to prevent damage or injury to the mounting edge 23′ comprising the edge of the forward projection 57 of the door 58 shown in FIGS. 6 and 7. Otherwise, this modification is identical to the form illustrated in FIGS. 6–9 and, therefore, further description would be redundant.

Numerous modifications and variations are contemplated within the broad scope of the present invention. For example, although not in a limiting sense, it should be noted that the engaging means, such as that shown at 22 in the first form of the invention and the equivalent means illustrated in connection with the other modifications of the invention, may engage various other suitable mounting edge parts of the vehicle. For example, a door window frame edge part or a door top edge part, or the like, may be so engaged in certain forms of the invention. Also, it should be noted that the carrier means may be modified substantially, as may the mirror mount as long as functional equivalency is provided by the structure.

It should be understood that the figures and the specific description thereof set forth in this application are for the purpose of illustrating the present invention and are not to be construed as limiting the present invention to the precise and detailed specific structure shown in the figures and specifically described hereinbefore. Rather, the real invention is intended to include substantially equivalent constructions embodying the basic teachings and inventive concept of the present invention.

I claim:

1. A rear view mirror device for mounting on the exterior side surface of a motor vehicle body; said device comprising a bifurcated bracket means of substantially V-shaped configuration as viewed in side elevation when in position of use, with the diverging ends of the component legs of said V-shaped configuration engaging the vehicle body at points spaced vertically from each other; said bracket means comprising first and second legs, said first leg having one end thereof provided with a downwardly directed hook portion engageable over an upwardly directed edge portion of the vehicle body and having the other end thereof provided with means detachably engaging said second leg intermediate the ends of said second leg for releasable fixed engagement with said second leg at any desired point along said second leg, and said second leg having body engaging means at the end thereof which is vertically spaced from said hook portion of said first leg and the other end of said second leg carrying a rear view mirror mounted thereon for universal angular adjustment.

2. A rear view mirror device as claimed in claim 1 in which said means detachably engaging said second leg intermediate the ends of said second leg comprises guide means disposed at an acute angle relative to the length of said first leg and along which guide means said second leg is slidable, and manually operable means for clamping said second leg in a desired postion longitudinally of said guide means.

3. A rear view mirror device as claimed in claim 1 in which said means detachably engaging said second leg intermediate the ends of said second leg comprises a sleeve disposed with the axis thereof extending upwardly and outwardly at an acute angle with respect to the horizontal in which said second leg is slidably received in said sleeve and in which manually operable means is provided for locking said second leg in a desired position longitudinally of said sleeve and rotatably about the axis of said sleeve.

References Cited in the file of this patent
UNITED STATES PATENTS

| | | |
|---|---|---|
| 2,024,468 | McGinley | Dec. 17, 1935 |
| 2,178,258 | Johnson | Oct. 31, 1939 |
| 2,259,179 | Sauer | Oct. 14, 1941 |
| 2,629,286 | Budreck | Feb. 24, 1953 |
| 2,655,338 | Stoger | Oct. 13, 1953 |